United States Patent [19]

Stevens

[11] Patent Number: 5,617,557

[45] Date of Patent: Apr. 1, 1997

[54] USING AN ADDRESS PIN AS A SNOOP INVALIDATE SIGNAL DURING SNOOP CYCLES

[75] Inventor: Jeffrey C. Stevens, Spring, Tex.

[73] Assignee: Compaq Computer Corporation, Houston, Tex.

[21] Appl. No.: 339,086

[22] Filed: Nov. 14, 1994

[51] Int. Cl.⁶ .................................................. G06F 12/16
[52] U.S. Cl. ............................................................ 395/473
[58] Field of Search .................................... 395/468, 473

[56] References Cited

U.S. PATENT DOCUMENTS

| | | | |
|---|---|---|---|
| 5,193,170 | 3/1993 | Lam | 395/473 |
| 5,210,845 | 5/1993 | Crawford et al. | 395/490 |
| 5,325,499 | 6/1994 | Kummer et al. | 395/494 |
| 5,408,636 | 4/1995 | Santeler et al. | 395/455 |

OTHER PUBLICATIONS

Pentium Processor User's Manual, vol. 1: Pentium Processor Data Book, Intel Corp., pp. 1–7 to 1–13, 3–13 to 3–25, 5–7 to 5–8, 5–28, 5–43, 6–34 to 6–44 (1994.

Primary Examiner—Eddie P. Chan
Assistant Examiner—Kevin L. Ellis
Attorney, Agent, or Firm—Pravel, Hewitt, Kimball & Krieger

[57] ABSTRACT

A circuit for responding to a microprocessor-generated write of a write-protected area of memory by invalidating a cache line corresponding to a write address in a microprocessor's internal cache by using a microprocessor address pin as a snoop invalidate signal during snoop cycles. This allows write-protected areas of a main memory to be cached in the internal cache of the microprocessor. The circuit monitors a processor bus to determine if the address associated with a write cycle corresponds to the write-protected area of memory. If so, the circuit latches in the write address, gains control of the processor bus by asserting an address hold signal to float the address pins of the microprocessor, and generates a snoop cycle on the processor bus. The cache line of the microprocessor's internal cache corresponding to the snoop address is invalidated, thereby preserving coherency of the write-protected data.

7 Claims, 6 Drawing Sheets

USING AN ADDRESS PIN AS A SNOOP INVALIDATE SIGNAL DURING SNOOP CYCLES

FIELD OF THE INVENTION

The invention relates to invalidating portions of a cache memory system, and more particularly, to the use of an address pin as a snoop invalidate signal during snoop cycles.

DESCRIPTION OF THE RELATED ART

A major bottleneck in computer speed has historically been the speed associated with a memory access. Generally the microprocessor has to wait for several clock cycles for data to be retrieved from main memory. To bridge the gap between the fast microprocessor cycle times and slow memory access times, the cache memory was developed. A cache is a small amount of very fast and expensive zero wait state memory that is used to store a copy of frequently accessed code and data from system memory. The cache is typically implemented with fast SRAMs. If the microprocessor accesses the cache memory and the accessed address location is stored in the cache, then a hit has occurred. If the access location is not in the cache memory, then a miss has occurred. If a miss occurs, data is retrieved from the main memory system.

The management or control of the cache memory is generally performed by a device referred to as a cache controller. The cache controller is principally responsible for keeping track of the contents of the cache as well as controlling data movement into and out of the cache. Another responsibility of the cache controller is the preservation of cache coherency, that is, the cache controller must continuously keep track of whether the copy of system memory stored in the cache is currently valid.

In addition, the cache controller is responsible for determining which memory addresses are cacheable addresses. Certain segments of addressable memory may not be allowed to reside in the cache due to cache coherency or other considerations. For example, memory that is read only or write protected is sometimes designated as not cacheable to prevent these locations from being modified in the cache. The cache controller is therefore responsible for preventing data associated with non-cacheable addresses from being placed in the cache.

There are generally two types of cache memory systems, write through and writeback. In a writethrough cache design, all writes to the cache are always broadcast to the main memory. In a writeback cache design, the writes are performed only to the cache, with the cache only providing the information to the system when another device requests the address. Thus, when a write hit occurs in a writeback cache, the cache location is updated with the new data but the write operation is not broadcast to system memory. The cache in this case holds a modified copy of the data and assumes the responsibility of providing this modified copy to other requesting devices. The location in system memory corresponding to the modified data is said to hold dirty data. Thus, in a writeback cache, the cache controller is required to snoop the system bus when it does not have control of the system bus to determine if other devices request memory locations corresponding to a location in the cache that holds modified data. If so, the cache controller must write back the modified data to system memory so that the requesting device can receive the correct copy of data. In addition, when a cache flush occurs, a writeback cache must write back all modified locations to system memory before the flush operation can occur.

As noted above, certain portions of the system memory that are designated read only or write protected are non-cacheable to prevent those locations from being modified in the cache. One such portion of the system memory is that segment which stores the basic input/output system (BIOS). The BIOS, which is stored in a read only memory (ROM), performs initialization of system components during power up of the computer system. A method of maximizing system efficiency is to copy the BIOS from the ROM into the system memory, which is typically implemented with dynamic random access memory (DRAM). This is advantageous as the DRAM is often 32 bits wide and the ROM is only 8 or 16 bits wide. Further, the memory access time for the DRAM is typically less than the access time for the ROM. One common method for accomplishing ROM relocation is to copy the ROM data into the high memory address locations of the DRAM. The memory map is then altered to enable the high memory DRAM to be addressed where the ROM was previously addressed. For example, in some computer systems developed by Compaq Computer Corporation, the BIOS is originally located at memory addresses 0x0FE0000 through 0x0FFFFFF, which correspond to the ROM. After power up of the computer system, the code in the system ROM is copied to memory address locations 0xFE0000 through 0xFFFFFFFF. Then the physical memory block starting at memory address 0x0E0000 is remapped to the memory block starting at address 0xFE0000.

To prevent the BIOS stored in the DRAM from being modified, the portions of the DRAM in which the BIOS is stored is designated as write protected. This is done by setting a bit referred to as a write protect bit in a status register associated with the particular block in the system memory.

To further enhance system performance, portions of the BIOS may be cached so that frequently used portions of the BIOS are immediately available to the microprocessor through the cache memory. However, typical cache controllers do not understand write protection. Therefore, a write by a microprocessor to a write protected address would result in incoherency between the cache and the system memory. To prevent this incoherency, prior systems designated the write protected area of system memory as non-cacheable. This resulted in an unacceptable performance drop. A method was developed to allow caching of the BIOS, described in pending patent application Ser. No. 08/255,233, entitled "Cache Memory Flushing System" to Paul Santeler, et al. In the Santeler system, whenever the microprocessor performs a write to an address location corresponding to a write protected area of memory, a flush command is asserted by the cache controller to flush the contents of the cache. By flushing the cache whenever a write occurs to an address corresponding to a write-protected area of memory, coherency between the cache and the write protected area of memory is maintained.

However, flushing the entire cache memory in response to a single write operation is not the optimal solution. After the cache flush has occurred, the cache memory has to be refilled, resulting in a large overhead, to obtain the benefit of its faster access time. Therefore, a better solution is desired.

SUMMARY OF THE PRESENT INVENTION

A circuit according to the present invention responds to a microprocessor-generated write to a write-protected area of memory by invalidating the corresponding cache line in the microprocessor's internal cache. In the computer system according to the present invention, certain write-protected areas of memory are cacheable in the internal cache of the microprocessor to improve memory access time. To prevent writes to these write-protected locations, the circuit monitors the processor bus to determine if such a write is occurring. If so, the circuit according to the preferred embodiment latches in the address of the write cycle, gains control of the processor bus, and performs a snoop cycle on the processor bus with this latched address to invalidate the cache line corresponding to the address of the microprocessor's internal cache. Thus, the circuit according to the present invention preserves the coherency of the write-protected data between the microprocessor's internal cache and the rest of the computer system in an efficient manner, while at the same optimizing overall computer system performance by allowing the write-protected data to be cached.

BRIEF DESCRIPTION OF THE DRAWINGS

A better understanding of the preferred embodiment can be obtained when the following detailed description of the preferred embodiment is considered in conjunction with following drawings in which.

DETAILED DESCRIPTION OF THE PREFERRED EMBODIMENT

The following disclosures are hereby incorporated by reference:

U.S. application Ser. No. 08/324,016, entitled "Single Bank, Multiple Way Cache Memory," by Alan L. Goodrum, Jens K. Ramsey, and Michael J. Collins, filed Oct. 14, 1994;

U.S. application Ser. No. 08/324,246, entitled "Memory Controller With Write Posting Queues for Processor and I/O Bus Operations and Ordering Logic for Controlling the Queues," by Michael J. Collins, Gary W. Thome, Michael Moriarty, Jens K. Ramsey, and John E. Larson, filed Oct. 14, 1994;

U.S. application Ser. No. 08/323,263, entitled "Data Error Detection and Correction System," by William J. Walker and Alan L. Goodrum, filed Oct. 14, 1994;

U.S. application Ser. No. 08/323,110, entitled "Circuit for Placing a Cache Memory Into Low Power Mode in Response to Special Bus Cycles," by Jens K. Ramsey, and Jeffrey C. Stevens, filed Oct. 14, 1994; and U.S. application Ser. No. 08/324,011, entitled "System for Arbitrating Access to Memory" by John E. Larson, Michael Moriarty, Michael J. Collins and Gary W. Thome, filed Oct. 14, 1994; all of which are assigned to the assignee of this invention.

Figure 1:
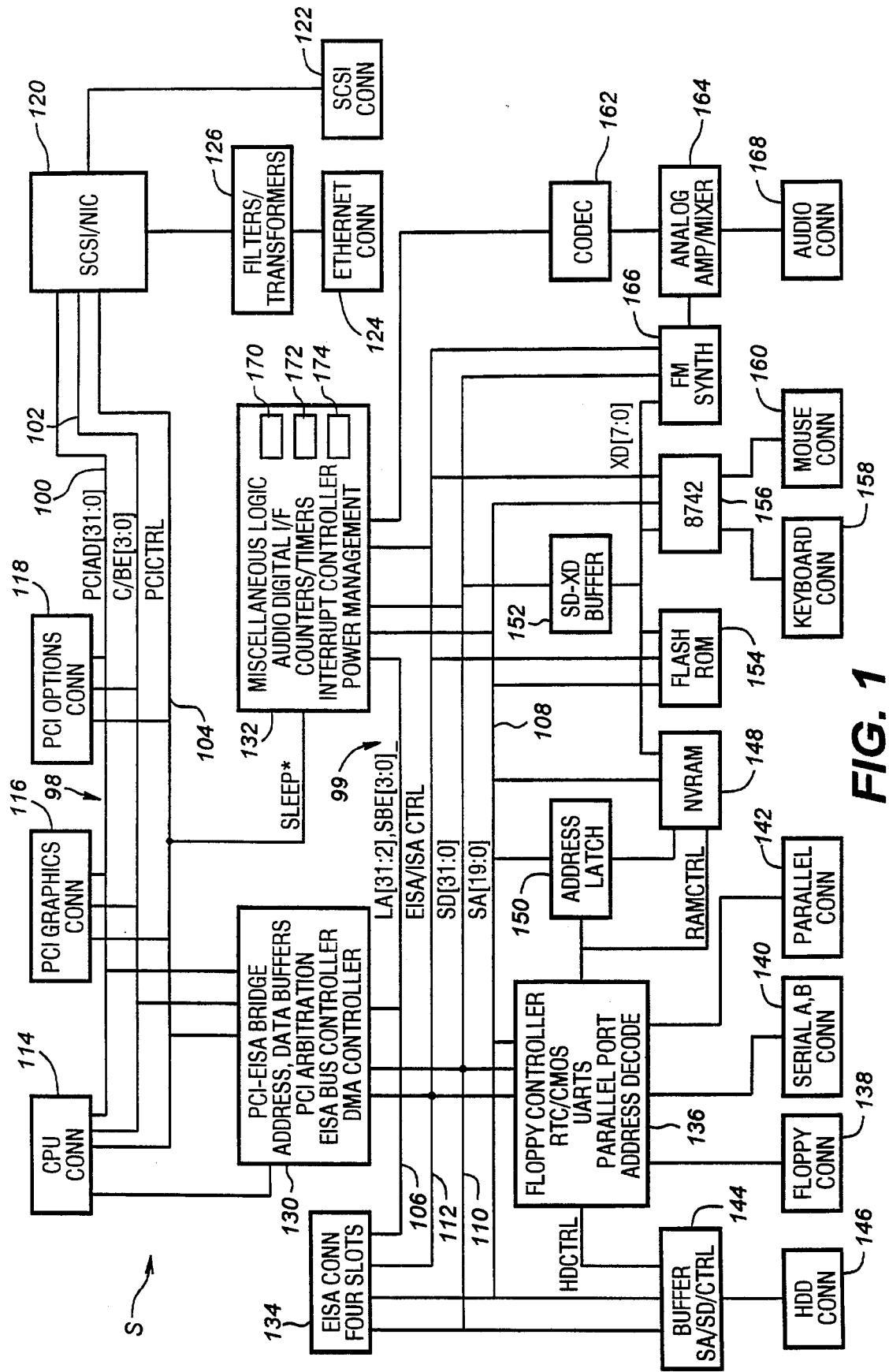
FIG. 1 is a block diagram of a system board used in an exemplary computer system incorporating the preferred embodiment of the present invention.

Referring now to FIG. 1, the system board S of an exemplary computer system incorporating the preferred embodiment of the present invention is shown. In the preferred embodiment, the system board S contains circuitry and slots for receiving interchangeable circuit boards. In the preferred embodiment, there are two primary buses located on the system board S. The first bus is the PCI or Peripheral Component Interconnect bus 98 which includes address/data portion 100, also referred to as PCIAD, control and byte enable portion 102 and control signal portion 104. The address/data bus PCIAD is preferably 32 bits wide, although it can be upgraded to 64 bits if desired. The second primary bus on the system board S is the EISA bus 99. The EISA bus 99 includes LA address portion 106, SA address portion 108, SD data portion 110 and EISA/ISA control signal portion 112. The PCI and EISA buses 98 and 99 form the backbones of the system board S.

Figure 2:
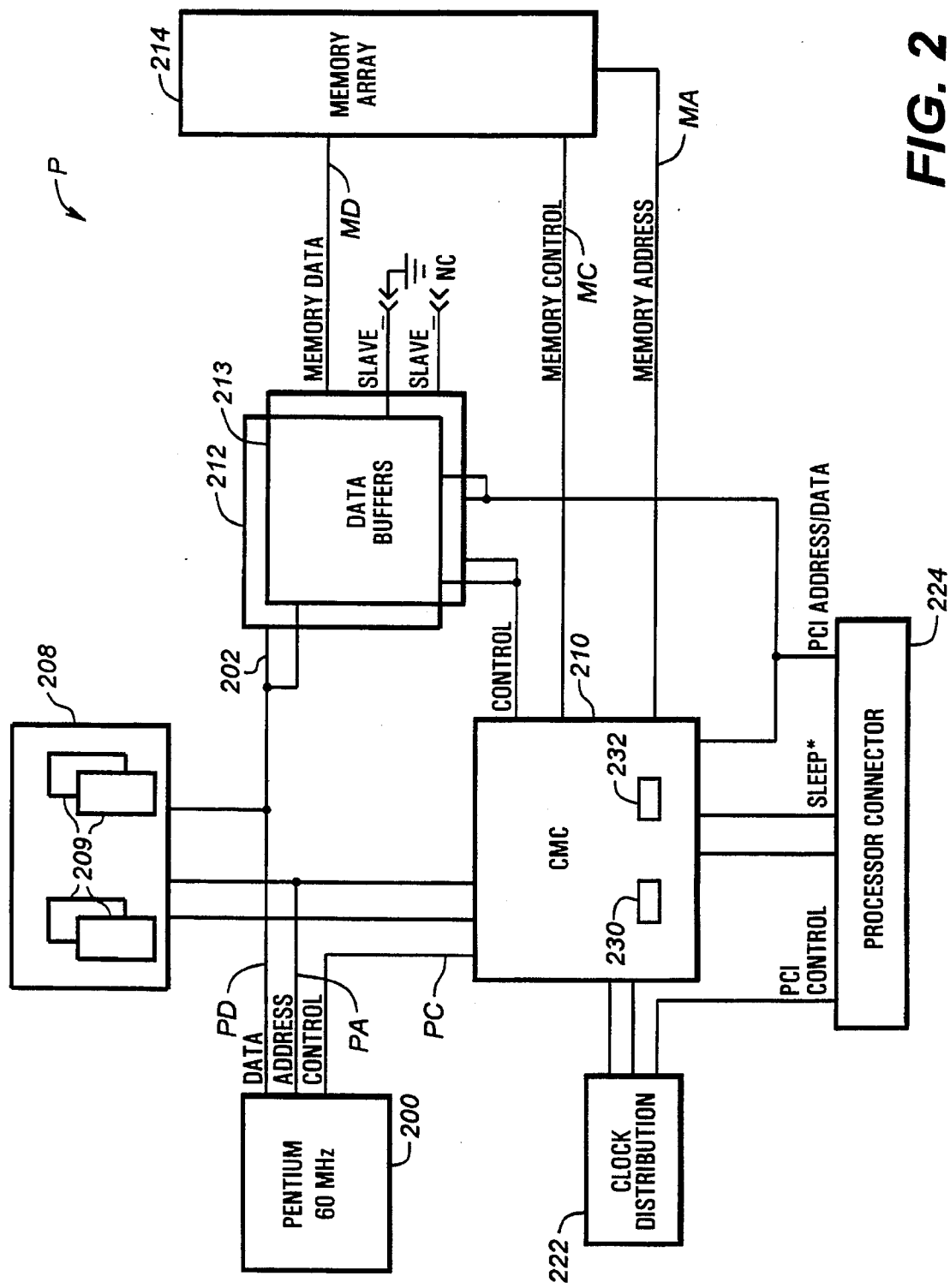
FIG. 2 is a block diagram of a processor board for connection to the system board of FIG. 1.

A CPU connector 114 is connected to the PCI bus 98 to receive a processor card, such as that shown in FIG. 2. A PCI graphics connector 116 is connected to the PCI bus 98 to receive a video graphics card (not shown). The graphics card provides video signals to an external monitor (not shown). A PCI option connector 118 is also connected to the PCI bus 98 to receive any additional cards designed according to the PCI standard. In addition, a SCSI and network interface (NIC) controller 120 is connected to the PCI bus 98. Preferably, the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system board S and computer to a local area network (LAN).

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus 99. In the preferred embodiment, the miscellaneous system logic chip 132 is implemented as an ASIC. The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry.

A series of four EISA slots 134 are connected to the EISA bus 99 to receive ISA and EISA adapter cards. A combination I/O chip 136 is connected to the EISA bus 99. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an IDE-type hard disk drive (not shown). A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably the NVRAM 148 is used to contain certain system information.

A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

Referring now to FIG. 2, a processor board P for use with the system board S is shown. In the processor board P, the CPU or microprocessor 200 is preferably the 64-bit Pentium P54 processor from Intel, which operates at 50 or 60 externally and 75 or 90 MHz internally. A 32-bit Pentium P24 processor can also be used for operation at 50 MHz externally and 75 MHz internally or 60 MHz externally and 90 MHz internally. The microprocessor 200 can also be a 486 DX4 processor, also from Intel, which operates at 33 Mhz externally and 100 MHz internally. Other processors may be utilized. The microprocessor 200 is connected to a processor bus 202 having data, address and control portions PD, PA and PC. When used with the Pentium P54 processor, the width of the data bus PD is 64 bits. With the Pentium P24 processor or the 486 DX4 processor, the width of the bus PD is 32 bits.

The microprocessor 200 includes an internal or L1 cache memory. A level 2 (L2) or external cache memory system 208 is connected to the processor bus 202 to provide additional caching capabilities to improve performance of the computer system. A processor cache and memory controller (CMC) and PCI bridge chip 210 is connected to the control portion PC and to the address portion PA. The CMC 210 receives the signal SLEEP* provided by the miscellaneous logic chip 132 to place the microprocessor 200 into low power mode. The CMC 210 also controls data buffers 212 and 213. Additionally, the CMC 210 provides control signals MC and address signals MA to a main memory 214. The control signals MC include various RAS* and CAS* signals. The CMC 210 is also connected to the L2 cache memory 208, as it incorporates the cache controller, and therefore, controls the operations of cache memory devices 209 in the L2 cache system 208. The cache memory devices 209 are implemented with static random access memories (SRAMs). For the 32-bit processors, cache memory sizes of 128K or 256K bytes are supported, with the cache line width being 16 bytes. For the 64-bit processors, cache sizes of 256K and 512K bytes are supported, with the cache line width being 32 bytes.

To detect if addresses provided by the microprocessor 200 or various PCI bus masters during a memory cycle are located in the L2 cache memory 208, two tag RAMs 230 and 232 are provided in the CMC 210. Preferably, the tag RAMs 230 and 232 are each oragnized as 2K×20. Depending on the size and associativity of the L2 cache memory 208, portions of processor address PA are used to index to a line in each tag RAM 230 or 232. For example, for a direct-mapped, 256K configuration having four lines per block and 16 bytes per line, processor address bit PA[17] selects one of the tag RAMs 230 or 232. Address bits PA[16:6] index to an entry in the selected tag RAM, and address bits PA[5:4] select the desired cache line. Each entry in the tag RAMs 230 or 232 contains a label and two state bits for each line in the block. Thus, for the above configuration, the 11 most significant bits comprise the label, which is compared to processor address bits PA[27:17] to determine if a match occurs. If the labels match, the state bits corresponding to the selected line are examined to determine the state of the cache line.

Another possible configuration is a 256K, two-way set associative cache having four lines per block and 32 bytes per line. For this configuration, the tag RAM 230 corresponds to the first way, and the tag RAM 232 corresponds to the second way. The indexing of the selected tag RAM is performed by address bits PA[17:7] and the line selection is done by bits PA[6:5]. The label is contained in processor address bits PA[27:18]. The above sets forth two possible configurations, it being understood that other configurations for the L2 cache memory 208 are available.

The data buffers 212 and 213, which are preferably implemented with ASICs, are connected between the processor data bus PD and the memory data bus MD provided by the memory array 214. The data buffers 212 and 213 are also connected to the PCI address and data bus PCIAD through a connector 224, which is provided to be mateably received by the processor connector 114. The data buffers 212 and 213 are connected to various control signals from the CMC 210.

The data buffers 212 and 213 each include a SLAVE_ input. As shown, the SLAVE_ input to the data buffer 212 is tied to ground and the SLAVE_ input of the data buffer 213 is not connected, the input being pulled high by an internal pull-up resistor. The data buffer 212 is referred to as the slave data buffer, and the data buffer 213 is referred to as the master data buffer. Each data buffer receives half the data bits from the processor, memory and PCI data buses PD, MD, and PCIAD, respectively.

Clock distribution and generation circuitry 222 is associated with the processor card P and is connected to the CMC 210. The clock distribution circuitry 222 provides a clock CLK to the processor bus 202. The processor connector 224 is connected to the CMC 210 and the clock distribution circuitry 222 to provide clocks to the computer system and to provide a PCI interface to allow the microprocessor 200 to access the PCI and EISA buses 98 and 99 and to allow PCI and EISA bus masters to access the main memory array 214. The PCI address and data are multiplexed on the bus PCIAD, with the address provided during the address phase and data provided during the data phase.

As discussed above, the exemplary computer system incorporating the preferred embodiment of the present invention can be configured to use either a 486 DX4 processor, a 32-bit Pentium processor, or a 64-bit Pentium processor. The internal or L1 cache of the 486 DX4 processor uses the writethrough cache consistency protocol. In the Pentium processors, two internal caches are utilized: a data cache and a code cache. The code cache is inherently write protected to prevent code from being inadvertently corrupted. However, the data cache is configurable to use either the writeback or writethrough cache consistency protocol on a line-by-line basis. A write to a writethrough cache line is accompanied by a write cycle to the main memory 214. Thus, the data in the main memory 214 is always consistent with a writethrough L1 cache. The writeback cache in the Pentium processor supports the MESI (Modified/Exclusive/Shared/Invalid) protocol, as is well known to those skilled in the art. A cache line in the M or modified state indicates that the line is available in only the L1 cache and that it is modified, that is, the line is different from the main memory 214 and the L2 cache memory 208. A line in the E or exclusive state indicates that the line is available in only the L1 cache, but the line is not modified. Read and write hits to a modified or exclusive line in the Pentium processors are not forwarded to the processor bus 202. The S or shared state indicates that a line is potentially shared with the L2 cache memory 208. A write to a shared line generates a writethrough cycle on the processor bus 202. A line in the I or invalid state indicates that the line is invalid. A read to this line results in a miss, requiring that the data be allocated from the L2 cache memory 208 or the main memory 214, and a write to the invalid line causes the Pentium processor to execute a writethrough cycle to the processor bus 202. An allocate is not performed in the Pentium L1 cache in the case of a write miss.

In a computer system incorporating the Pentium processor, snoop or inquire cycles are initiated by the CMC 210 to determine if a line is present in the L1 code or data cache. The inquire or snoop cycles are driven to the Pentium processor when a PCI bus master initiates a read or write bus cycle. If the snooped line in the L1 data cache is in the modified state, the Pentium processor has the most recent information and must schedule a writeback of the data to the main memory 214. Another situation that will cause the Pentium processor to write back the contents of its modified lines is if a flush cycle is executed on the processor bus 202. A flush cycle invalidates the entire L1 cache, thereby requiring that the main memory 214 must be updated.

In the computer system according to the preferred embodiment, the write protected areas of the main memory 214 are cacheable in the L1 cache and in the L2 cache memory 208. To maintain coherency between the L1 cache and the main memory 214, a write to a location in the L1 cache corresponding to a write-protected area of the main memory 214 causes the corresponding line in the L1 cache to be invalidated. As explained above, all writes executed by the 486 DX4 processor to its writethrough internal cache are accompanied by write cycles to the processor bus 202. In the case of the Pentium processors, however, the lines of the L1 data cache that store write-protected data must be configured as writethrough. Otherwise, if the line is configured as writeback, it is possible that a write of protected data may go undetected on the external processor bus 202. Thus, in accordance with the present invention, the CMC 210 monitors the processor bus 202 for writes to addresses corresponding to write-protected areas of the main memory 214. When such a cycle is detected, the CMC 210 responds by invalidating the selected line in the L1 cache. To perform this invalidation of a cache line in a Pentium processor, a snoop or inquire cycle is generated by the CMC 210 on the processor bus 202. For more description of inquire cycles, refer to *Pentium Processor Users Manual, Vol. 1: Pentium Processor Data Book* (1994), which is hereby incorporated by reference.

An inquire cycle to the Pentium processor is performed by asserting the address hold signal AHOLD high to force the Pentium processor to float its address output pins. After waiting two clock cycles, the invalidation request signal INV is driven and the signal EADS* is asserted low. If the signal INV is driven low, the cache line corresponding to the inquire address is marked as shared, whereas if the signal INV is driven high, the line is invalidated. If the inquire cycle results in a hit to a line in the L1 cache, the Pentium processor drives its HIT* pin active. In addition, the HITM* pin is driven active if the inquire cycle hits a modified line in the data cache. For the 486 DX4 processor, snoop cycles are performed by asserting the address hold signal AHOLD and the valid external address signal EADS*. If the address is located in its internal cache, the 486 processor invalidates the cache line; otherwise, no action is taken. Processor address bits PA[31:5] are used in the Pentium processor to determine a cache line hit, as the cache line width is 32 bytes. For the 486 processor, whose cache line width is 16 bytes, address bits PA[31:4] are used to determine if a line is cached.

The following describes in more detail the circuitry in the CMC 210 according to the present invention that performs the above noted functions. In the description that follows, portions of the CMC 210 that are not related to the present invention are not discussed for simplicity.

Figure 3A:
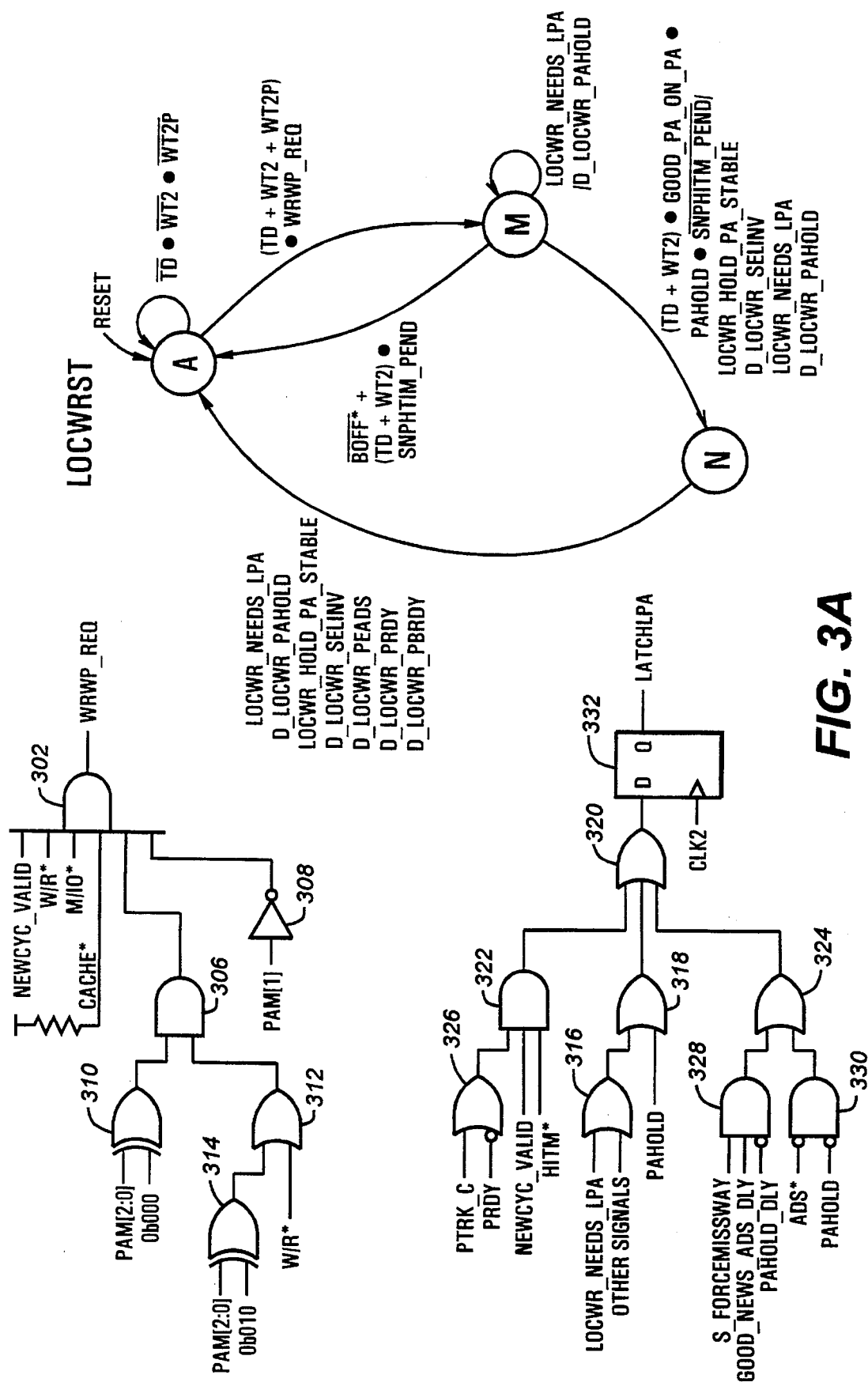
FIGS. 3A and 3B are logic diagrams of circuitry for monitoring the processor bus for write cycles to write-protected areas of memory.
Figure 3B:
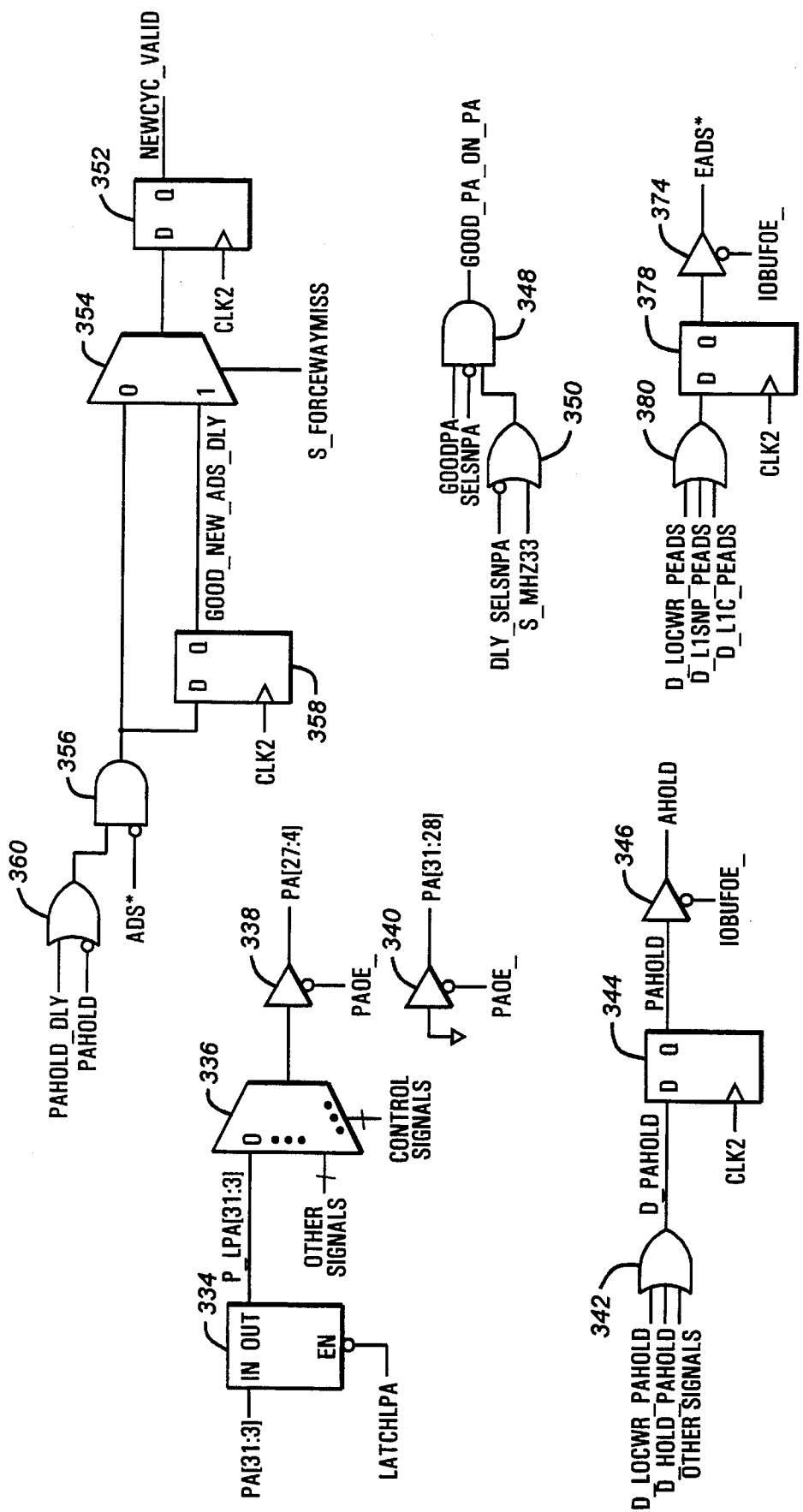

Referring now to FIGS. 3A and 3B, logic is shown of circuitry that responds to the detection of a write cycle on the processor bus 202 having an address corresponding to a write-protected area of the main memory 214. Portions of a state machine LOCWRST are shown that respond to such a write operation. On system reset, indicated by a signal RESET being asserted high, the state machine LOCWRST enters state A, where it remains while the signals TD, WT2 or WT2P are all deasserted low.

The signals TD, WT2 and WT2P are representative of the state of the current processor bus cycle. Control of the signals is provided by a state machine PTRK described in FIG. 4, to which reference is now made. On system reset, the state machine PTRK enters state A. The state machine remains in state A until the address strobe ADS* is asserted low by the microprocessor 200 to indicate the start of a new cycle. Assertion of the signal ADS* causes the state machine PTRK to transition from state A to state B. A signal T2 is asserted high while the state machine PTRK is in state B. The state machine remains in state B if the following expression is true:

BOFF*●(!ENDPCYC+!ADS*)●(SYNC_ENDPCYC+ADS*) The backoff input BOFF* to the microprocessor 200 is asserted low by the CMC 210 to abort all outstanding bus cycles that have not yet completed. In response to the backoff request, the microprocessor 200 floats most of its output pins. When the signal BOFF* is negated high, the microprocessor 200 restarts the instruction that was interrupted. The signal ENDPCYC, which is provided by an OR gate 402, indicates the current cycle has completed. The signal SYNC_ENDPCYC indicates that an outstanding bus cycle has completed, as described below. Thus, the state machine remains in state B while one cycle is outstanding. If the signal BOFF* is asserted indicating a termination of the outstanding cycle or if the signal ENPCYC is asserted and the signal ADS* is negated, indicating competition of the outstanding cycle with another not starting, the state machine returns to state A to await the next cycle. One input of the OR gate 402 receives a signal PRDY provided by an inverter 404, and the other input receives a signal SYNC_CYCLE_ABORTED, which is asserted high to indicate that the current cycle is being aborted, which occurs on a hit to a modified line in the L1 cache or the L2 cache memory 208, or when the backoff signal BOFF* is asserted. The input of the inverter 404 is connected to a signal PRDYO_, which drives the RDY* signal to the microprocessor 200 to acknowledge the successful completion of the current cycle.

The signal PRDYO_ is provided by a NOR gate 406. One input of the NOR gate 406 receives a signal SYNC_PRDY. The NOR gate 406 also receives other signals, which are not relevant to the present invention, and thus are not described for the sake of brevity. The signal SYNC_PRDY is provided by a D flip-flop 408, which is clocked by a clock signal CLK2. The signal CLK2 is the internal clock of the CMC 210. The D input of the D flip-flop 408 is connected to the output of an OR gate 410, whose inputs receive signals D_LOCWR_PRDY, D_RDHIT_PRDY, D_PCIWR_PRDY, D_SPCYC_PRDY, D_PCIRD_PRDY, D_MEMRD_PRDY, and D_REQ_PRDY. The above signals correspond to signals asserted to acknowledge the end of the following cycles, respectively: a local memory write cycle from the processor bus 202; a cycle responding to a read hit in the L2 cache memory 208; a write cycle to the PCI bus 98 initiated by the microprocessor 200; a special bus cycle such as the shutdown, flush, halt or writeback special cycles; a read cycle to the PCI bus 98 from the microprocessor 200; a read cycle of the memory 214 initiated by the microprocessor 200; and cycles executed in response to queued requests in the CMC 210 and the data buffers 212 and 213.

Returning now to the state machine PTRK, states A, B and C are indicated by signals PTRK_A, PTRK_B, and PTRK_C, respectively. The signal PTRK_B is provided to one input of an AND gate 412, whose other input receives the inverted state of the address strobe ADS*. The output of the AND gate 412 is connected to one input of an OR gate 414, whose other input receives the signal PTRK_C. The output of the OR gate 414 is connected to the D input of a D flip-flop 416, which is clocked by the signal CLK2. The output of the D flip-flop 416 provides a signal EN_TD. The signals EN_TD and T2 are provided to two inputs of a three-input AND gate 418. The third input of the AND gate 418 is connected to the output of a latch 420, whose input is connected to the processor write/read signal W/R*. The state of the signal W/R* is latched when the signal ADS* is asserted low. The output of the AND gate 418 provides a signal TD.

A description of the various states of processor bus cycles according to Intel terminology is provided here. The first clock of a processor bus cycle is referred to as state T1. During this state, the address strobe ADS* is asserted and valid address and status signals are driven onto the processor bus 202. The second and subsequent clocks of the processor bus cycle are referred to as state T2. In state T2, data is driven out if the cycle is a write, or data is expected if the cycle is a read. During state T2, the microprocessor 200 samples its RDY* or BRDY* pins to determine if the bus cycle has completed. In addition, more processor bus states are defined for the Pentium processor, as it is capable of generating pipelined cycles. A pipelined cycle is one in which a second bus cycle is generated before the first bus cycle has completed, which causes two bus cycles to be outstanding on the processor bus 202 at one time. The pipelined state where two cycles are outstanding is referred to as state T2P.

If the address strobe ADS* is sampled asserted and the signal SYNC_ENDPCYC is deasserted low, the state machine PTRK transitions from state B to state C. The signal SYNC_ENDPCYC is provided by an OR gate 403, whose inputs receive the signal SYNC_PRDY and a signal PCIRD_ASYNC_PRDY for indicating the end of a read cycle on the PCI bus 98 initiated by the microprocessor 200. The signal SYNC_ENDPCYC if asserted high indicates that an outstanding bus cycle has completed.

State C of the state machine PTRK corresponds to processor bus state T2P, as there are currently two outstanding processor bus cycles. In state T2P, data is being transferred and the Pentium processor samples for the assertion of the BRDY* signal. In state C, the state machine PTRK transitions back to state B if the signal SYNC_ENDPCYC is asserted. Assertion of the signal SYNC_ENDPCYC indicates that one cycle has completed; as a result, the state machine PTRK transitions back to state B to indicate that only one cycle is outstanding.

In the preferred embodiment, write cycles are never pipelined. However, if a write cycle is asserted after a pipelined read cycle, a dead clock is required to turn the processor bus 202 around from a read to a write. Thus, when a pipelined cycle is detected (the state machine PTRK is in state C or it is in state B and a new ADS* is asserted before completion of one bus cycle), the D flip-flop 416 asserts the signal EN_TD to indicate that a dead clock may potentially be needed. If indeed a write cycle is generated, as indicated by the signal W/R* being driven high, the signal TD is asserted high to indicate a dead clock cycle.

The signal WT2 is provided by an AND gate 422, which receives the signal T2 and the inverted state of the signal EN_TD. The inputs of the AND gate 422 are also connected to the output of the latch 420 and the output of a NAND gate 424. The first input of the NAND gate 424 receives the inverted state of the cacheability signal CACHE*, and the other input is connected to the signal W/R*. If the signal CASHE* is asserted low and the signal W/R* is driven high in a write cycle, then a burst writeback cycle is being performed on the processor bus 202. A burst writeback cycle causes the signal WT2 to be disabled. The signal WT2 is thus asserted high in a regular write cycle.

The signal WT2P is provided by AND gate 426, whose first input receives the signal PTRK_C and whose second input is connected to the output of the latch 420. The signal WT2P thus indicates that a write (W/R* high) has been detected while a pipelined read is in progress. This indicates that the next processor clock will be a dead clock cycle.

Referring back now to FIG. 3A, the state machine LOCWRST transitions from state A to state M if any one of the signals TD, WT2P, or WT2 is asserted high and the signal WRWP_REQ is asserted high. The signal WRWP_REQ is provided by an AND gate 302, and indicates if a write has occurred to a write-protected area of the memory 214. The inputs of the AND gate 302 receive signals NEWCYC_VALID, asserted high to indicate the detection of a valid new bus cycle; the signal W/R* for indicating a write or a read; the signal M/IO* for indicating a memory or an I/O cycle; and the signal CACHE* for indicating if a burst writeback. If the microprocessor 200 is a 486 DX4 processor, the CASCHE* input to the CMC 210 is left unconnected. An internal pullup resistor 304 is provided to pull the signal CACHE* high.

The signal NEWCYC_VALID is provided by a D flip flop 352, whose D input receives a signal D_NEWCYC_VALID provided by the output of a multiplexor 354. The 0 and 1 inputs of the multiplexor 354 are connected to the output of an AND gate 356 and the output of a D flip flop 358, respectively. The output of the D flip flop 358 is designated as a signal GOOD_NEW_ADS_DLY. The multiplexor 354 is selected by a signal S_FORCEWAY-MISS, which preferably corresponds to bit 4 of a configuration register. The signal S_FORCEWAYMISS is set high to force a wait state for address decoding in the CMC 210 during operation at 60 MHz.

The D flip flop 358 is clocked by the signal CLK2, and its D input is connected to the output of the AND gate 356. The inputs of the AND gate 356 are connected to the inverted state of the address strobe ADS* and the output of an OR gate 360. The inputs of the OR gate 360 receive signals PAHOLD_DLY and the inverted state of a signal PAHOLD. Assertion of the signal PAHOLD causes the CMC 210 to assert an address hold signal AHOLD to the microprocessor 200, which causes the microprocessor 200 to tristate all its address signal outputs. The signal AHOLD is driven high to allow the CMC 210 to drive a snoop address onto the address bus PA during a snoop cycle, which allows the microprocessor 200 and the CMC 210 to determine if the addressed data is stored in the L1 cache or the L2 cache memory 208. For non-snoop cycles, the signal PAHOLD is deasserted low, thereby enabling the AND gate 312 to detect activation of the address strobe ADS*. The signal PAHOLD_DLY is the signal PAHOLD delayed by one CLK2 cycle, and is used to qualify the address strobe ADS* to determine if an L1 writeback cycle initiated by the microprocessor 200 is occurring.

The other inputs of the AND gate 302 are connected to the output of an AND gate 306 and the output of an inverter 308. The input of the inverter 308 receives a signal PAM[1]. The first input of the AND gate 306 is connected to the output of an exclusive OR gate 310, and its other input is connected to the output of an OR gate 312. The first input of the OR gate 312 is connected to the output of an exclusive OR gate 314, and its other input receives the signal W/R*. The exclusive OR gate 310 compares the value of signals PAM[2:0] with the value 0b000. The exclusive OR gate 314 compares the value of signals PAM[2:0] with the value 0b010.

If the processor address PA is within a certain range, the signals PAM[3:0] are assigned the values of programmable attribute map (PAM) registers located in the CMC 210 for controlling access to certain portions of the main memory 214. Seven registers, referred to as the PAM0, PAM1, PAM2, PAM3, PAM4, PAM5 and PAM6 registers, are located in the configuration address space, respectively. Each PAM register is divided into two nibbles, with each nibble controlling a portion of the memory address space. In the first nibble, bits 0–3 correspond to the read enable, write enable, cache enable, and PCI enable bits, respectively. In the second nibble, bits 4–7 are the read enable, write enable, cache enable, and PCI enable bits, respectively. If the read enable bit is set, then the microprocessor 200 is able to read the main memory 214 in the specified address range. If this bit is cleared, then a read cycle to the specified address is performed on the PCI bus 98. Setting the write enable bit allows the microprocessor 200 to write the corresponding portion of the main memory 214. If this bit is cleared, then a write cycle to the specified address is performed on the PCI bus 98. Thus, to write protect a portion of the memory space, the corresponding write enable bit is cleared. The cache enable bit controls whether the corresponding address range is cacheable. Finally, if the PCI enable bit is set, then PCI bus masters are allowed to access the main memory 214 in the corresponding address space.

If any of the processor address bits PA[27:19] are high, then the signals PAM[2:0] are assigned the value 0b111 to enable reads or writes to the main memory 214 and to allow caching. However, if the processor address PA contains a value corresponding to one of the PAM registers, then the contents of the selected PAM register are loaded into PAM [3:0]. In the preferred embodiment, the upper nibble of the PAM0 register corresponds to the BIOS memory area 0xF0000 through 0xFFFFF. The lower nibble of the PAM1 register corresponds to the BIOS memory area 0xC0000-0x7FFFF. The upper and lower nibbles of the PAM2 register correspond to BIOS memory area 0xCC000-0xCFFFF and 0xC8000-0xCBFFF, respectively. The PAM3 and PAM4 registers correspond to BIOS memory area 0xD0000-0xD-FFFF. The lower nibble of the PAM5 register and the lower nibble of the PAM6 registers correspond to BIOS memory area 0xE0000-0xEFFFF.

If the signal PAM[2:0] contains the value 0b000, then the exclusive OR gate 310 drives its output low to disable the signal WRWP_REQ. This value of PAM[2:0] indicates that the data associated with the selected address is not cacheable and resides on the PCI bus 98 or the EISA bus 99. As a result, the CMC 210 forwards the write request to the PCI bus 98. For read cycles, the AND gate 306 outputs a low if the value of the signals PAM[2:0] is equal to 0b000 or 0b010, which indicate that the read must be performed on the PCI bus 98. Thus, effectively, the output of the AND gate 306 if deasserted low indicates that the bus cycle is not to the main memory 214, but to the PCI bus 98.

The signal PAM[1], which is provided to the input of the inverter 308, indicates if a write of the main memory 214 at the selected address is enabled. If the signal PAM[1] is set low, then that indicates that either the selected address in the main memory 214 is write protected or located on the PCI bus 98. The output of the AND gate 306 distinguishes between these two conditions. Thus, the signal WRWP_REQ is asserted high to indicate a write operation to a write protected location of the main memory 214 if a memory write cycle is detected on the processor bus 202, the write is not a writeback cycle, and the outputs of the AND gate 306 and inverter 308 are driven high.

Returning now to the state machine LOCWRST, the state machine LOCWRST returns from state M to state A if the signal backoff BOFF* is asserted low, or if a signal SNPHITM_PEND is asserted high and one of the signals TD or WT2 is asserted high. The signal SNPHITM_PEND indicates that a hit to a modified line has occurred in the internal cache of the microprocessor 200 or in the L2 cache memory 208, and that a writeback cycle is currently being executed on the processor bus 202.

Figure 4:
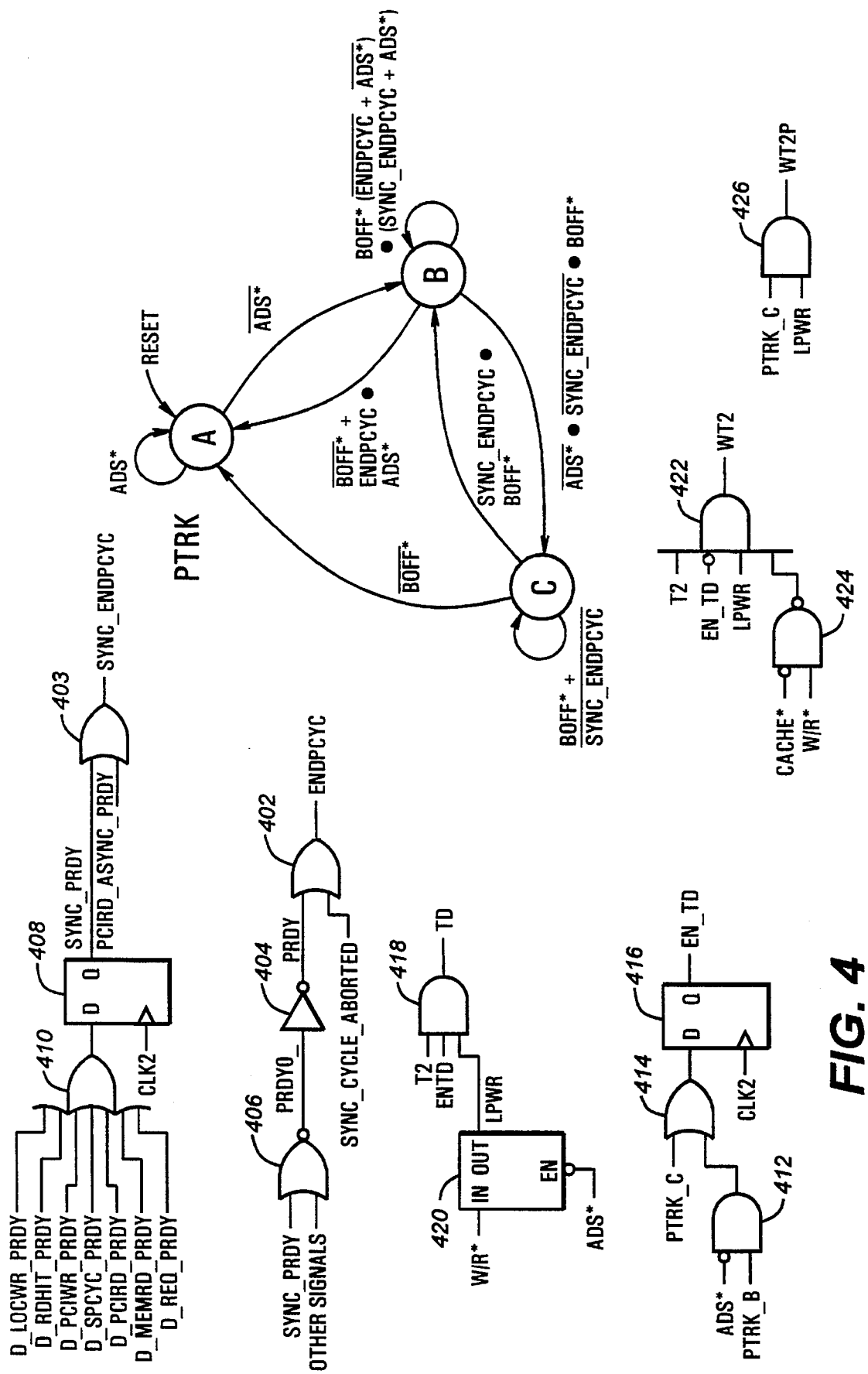
FIG. 4 is a logic diagram of circuitry for tracking cycles on the processor bus.

In state M, signals LOCWR_NEEDS LPA and D_LOCWR_PAHOLD are asserted high. The signal LOCWR_NEEDS_LPA, which causes the CMC 210 to latch in the address provided with the write cycle on the proceessor address bus PA, is connected to one input of an OR gate 316. The other inputs of the OR gate 316 are connected to other signals asserted in other cycles requiring the latching of the processor address PA. The output of the OR gate 316 is connected to one input of an OR gate 318, whose other input receives a signal PAHOLD. The signal PAHOLD drives the address hold signal AHOLD, which causes the microprocessor 200 to float its address output pins. The signal AHOLD is used in snoop cycles to allow the CMC 210 to drive the snoop address onto the address bus PA. Thus, the signal PAHOLD is provided to the OR gate 318 to act as an interlock to prevent the latching of address driven by the CMC 210 itself. The output of the OR gate 318 is connected to one input of a three-input OR gate 320. The other inputs of the OR gate 320 are connected to the output of an AND gate 322 and the output of an OR gate 324. The output of the OR gate 320 is connected to the D input of a D flip-flop 332, which is clocked by the signal CLK2. The output of the D flip-flop provides a signal LATCHLPA, which is reset low on the rising edge of the system reset signal RESET. The AND gate 322 receives signals NEW_CYC_VALID and HITM*. Another input of the AND gate 322 is connected to the output of an OR gate 326, whose inputs receive the signal PTRK_C and the inverted state of the signal PRDY, which is provided by the inverter 404 (FIG. 4). This path allows the processor address PA to be latched in a pipelined cycle, the latching signal LATCHLPA not being cleared until the ready signal PRDY has been asserted high to indicate completion of one cycle.

The inputs of the OR gate 324 are connected to the output of an AND gate 328 and the output of a NOR gate 330. The NOR gate 330 receives the address strobe ADS* and the signal PAHOLD. When the signal ADS* is asserted, and the signal PAHOLD is deasserted low, the signal LATCHLPA is asserted. This is the path for latching the processor address PA when the signal ADS* is asserted. The signals PAHOLD_DLY and PAHOLD are provided to the AND gate 328 and the NOR gate 330, respectively, to prevent latching of the processor address bus PA when the CMC 210 is itself driving the processor address bus PA. The inputs of the AND gate 328 receive signals S_FORCEWAYMISS, GOOD_NEW_ADS_DLY and the inverted state of signal PAHOLD_DLY. If the microprocessor 200 is being operated at 60 Mhz, the signal S_FORCEWAYMISS is set high to force a wait state for address decoding in the CMC 210. The signals GOOD_NEW_ADS_DLY and PAHOLD_DLY are delayed versions of the address strobe ADS* and PAHOLD, respectively. At 60 Mhz operation, the signal GOOD_NEW_ADS_DLY extends the assertion of the signal LATCHLPA by one CLK2 cycle.

The signal LATCHLPA controls the latching of processor address signals PA[31:3] by a latch 334. The processor address signals PA[31:3] are latched when the signal LATCHLPA is driven high. The output of the latch 334, designated as signals P_LPA[31:3], is provided to the 0 input of a multiplexor 336, whose other inputs receive various other address signals, such as addresses used during snoop cycles, flush cycles, or writeback cycles. Selection of the proper inputs is performed by various control signals, with the 0 input being the default. The output of the multiplexor 336 is connected to the input of a tri-state buffer 338, which drives processor address signals PA[27:4]. The tri-state buffer 338 is enabled by a signal PAOE_, which is active low. The processor address signals PA[31:28] are driven by a tri-state buffer 340, whose input is grounded. The tri-state buffer 340 is also enabled by the signal PAOE_. Processor address signals PA[31:28] are grounded low because the main memory 214 in the preferred embodiment supports up to a maximum of 256M bytes.

In state M, the state machine LOCWRST also asserts the signal D_LOCWR_PAHOLD for driving the address hold signal AHOLD active. The signal D_LOCWR_PAHOLD is provided to one input of an OR gate 342. Another input of the OR gate 342 receives a signal D_HOLD_PAHOLD for maintaining the address hold signal AHOLD asserted. The other inputs of the OR gate 342 receive various other signals asserted during other cycles to drive the address hold signal AHOLD. The output of the OR gate 342 is connected to the D input of a D flip-flop 344, which is clocked by the signal CLK2. The output of the D flip-flop 344 provides the signal PAHOLD, which is received by a tri-state buffer 346. The tri-state buffer 346 is enabled by an active low signal IOBUFOE_ and drives the address hold signal AHOLD. The signal IOBUFOE_ is normally asserted low, and is deasserted high only during certain test cycles. Thus, in state M, the processor address PA corresponding to the write protected area of main memory 214 is latched into the CMC 210. Simultaneously, the address hold signal AHOLD is provided to the microprocessor 200 to cause it to float it address output pins. This enables the CMC 210 to drive the processor address bus PA to perform the invalidation cycle.

If either of the signals TD or WT2 is asserted high, the signals GOOD_PA_ON_PA and PAHOLD are asserted high, and the signal SNPHITM_PEND is deasserted low, then the state machine LOCWRST transitions from state M to state N. The signal GOOD_PA_ON_PA is provided by an AND gate 348 for indicating that the CMC 210 has driven valid data onto the processor address bus PA. One input of the AND gate 348 receives a signal GOODPA, another input receives the inverted state of a signal SELSNPA, and its third input is connected to the output of an OR gate 350. If deasserted low, the signal SELSNPA indicates that a snoop cycle is in progress. The OR gate receives a signal S_MHZ33 and the inverted state of a signal DLY_SELSNPA, which is a delayed version of the signal SELSNPA. When set, the signal S_MHZ33 indicates that the processor clock speed is 33 Mhz. At 50 or 60 MHz operation, the AND gate 348 is not enabled until one CLK2 cycle after the signal SELSNPA is deasserted low.

Figure 5:
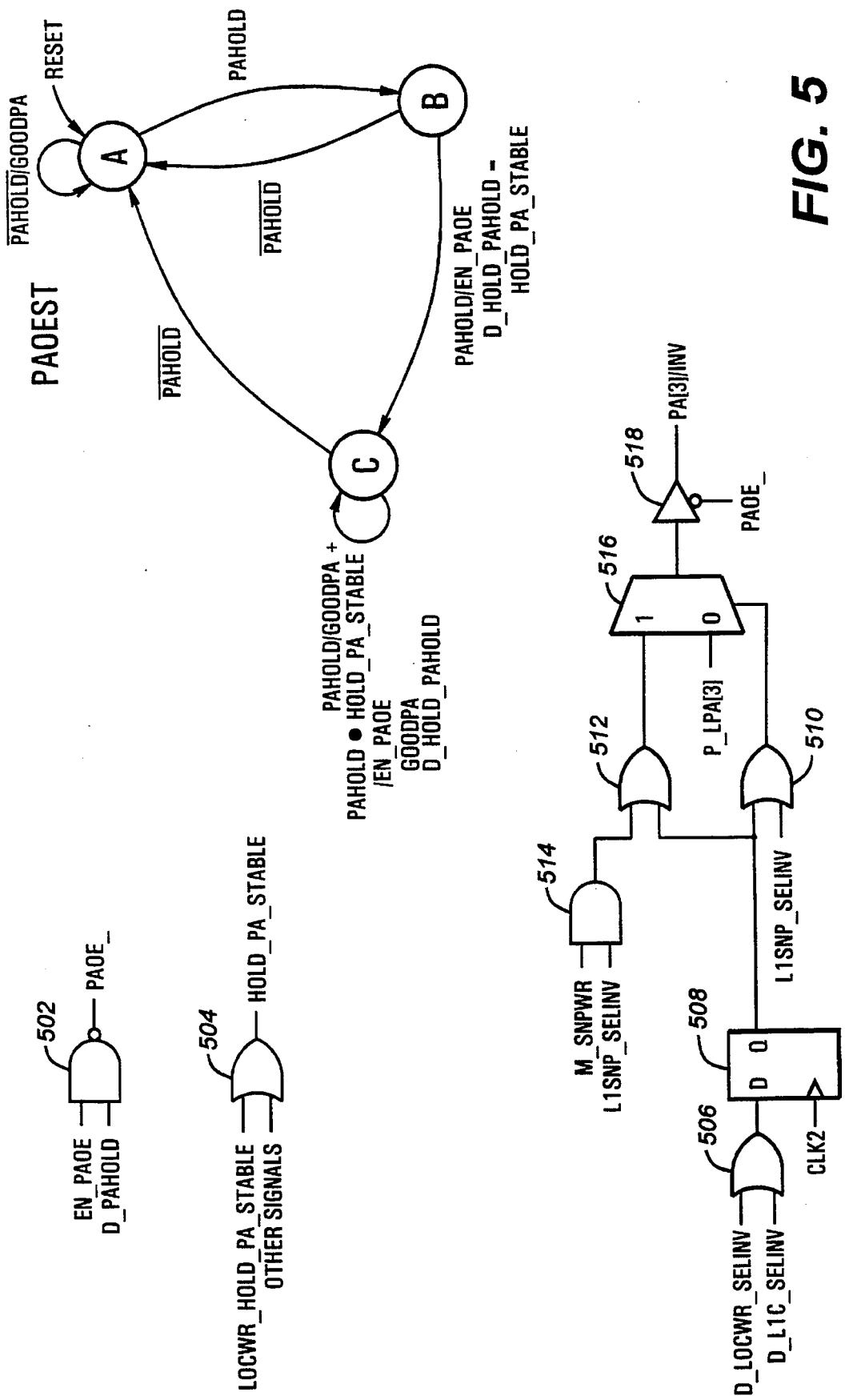
FIG. 5 is a logic diagram of circuitry for enabling the driving of the snoop address and an invalidation signal.

The signal GOODPA is provided by a state machine PAOEST, shown in FIG. 5, to which reference is now made. On system reset, the state machine PAOEST enters state A, where it remains until the signal PAHOLD is asserted high. While in state A, the state machine PAOEST drives the signal GOODPA high. When the signal PAHOLD is asserted high, the state machine PAOEST transitions from state A to state B, deasserting the signal GOODPA low. If the signal PAHOLD is deasserted low in state B, the state machine returns to state A, maintaining the signal GOODPA low. However, if the signal PAHOLD is maintained high, the state machine PAOEST transitions from state B to state C. In the transition, the signal GOODPA is maintained low but the signal EN_PAOE is asserted high. The signal EN_PAOE is provided to one input of a NAND gate 502, whose other input is connected to the output of the OR gate 342 (FIG. 3B). The NAND gate 502 drives the processor address enable signal PAOE_ to enable or disable the driving of the processor address bus PA by the CMC 210. The input of the NAND gate 502 is connected to the output of the OR gate 342 to allow the signal PAOE_ to be deasserted high one CLK2 clock earlier to disable CMC 210 from driving the processor address PA, thereby avoiding any potential contention with the microprocessor 200.

When the state machine PAOEST transitions from state B to state C, a signal D_HOLD_PAHOLD is asserted high if an input signal HOLD_PA_STABLE is asserted. As noted above, the signal D_HOLD_PAHOLD is provided to the OR gate 342 to maintain the address hold signal AHOLD driven high. The signal HOLD_PA_STABLE is provided by an OR gate 504, whose first input receives a signal LOCWR_HOLD_PA_STABLE. The other inputs of the OR gate 504 are connected to various other signals asserted during cycles requiring that the address hold signal AHOLD be maintained. The signal LOCWR_HOLD_PA_STABLE is asserted high when the state machine LOCWRST in FIG. 3A transitions from state M to state N. With the signal PAHOLD asserted high, the state machine PAOEST remains in state C, asserting the signal GOODPA high. In addition, if the signal HOLD_PA_STABLE is also asserted high, the state machine PAOEST maintains the signals EN_PAOE and D_HOLD_PAHOLD asserted to maintain the signal PAHOLD in the high state. If the signal PAHOLD is deasserted low in state C, the state machine PAOEST transitions back to state A.

Referring back to FIG. 3A and the state machine LOCWRST, assertion of the signal GOODPA causes the signal GOOD_PA_ON_PA to be driven high. As a result, if the signal PAHOLD and either of the signals TD or WT2 are asserted high, the state machine LOCWRST transitions from state M to state N. With the transition, the signal LOCWR HOLD_PA_STABLE and a signal D_LOCWR_SELINV is asserted high. As noted above, the signal LOCWR_HOLD_PA_STABLE is asserted high to maintain the address hold signal AHOLD asserted in the snoop cycle.

Referring again to FIG. 5, the signal D_LOCWR_SELINV is provided to one input of an OR gate 506. The other input of the OR gate 506 receives a signal D_L1C SELINV. The signal D_L1C SELINV is asserted high to invalidate a line in the internal cache of the microprocessor 200 if the snooping logic in the CMC 210 detects that the same line in the main memory 214 is concurrently being written to by another bus master while a read cycle is pending from the microprocessor 200. The output of the OR gate 506 is connected to the D input of a D flip-flop 508, which is clocked by the signal CLK2. The output of the D flip-flop 508 is connected to one input of an OR gate 510, and also to one input of an OR gate 512. The other input of the OR gate 510 receives a signal L1SNP_SELINV, which is asserted high to invalidate an internal cache line in the microprocessor 200 in a snoop cycle requested by a memory access from a PCI bus master. The other input of the OR gate 512 is connected to the output of an AND gate 514, which receives signals M_SNPWR and L1SNP_SELINV. The signal M_SNPWR if asserted high indicates that the PCI bus master cycle is a PCI-to-memory write cycle. The L1 cache line is invalidated only if the PCI memory access is a write cycle. The output of the OR gate 512 is connected to the 1 input of a multiplexor 516, whose 0 input is connected to the bit P_LPA[3] from the processor address latch 334 (FIG. 3B). The select input of the multiplexor 516 is connected to the output of the OR gate 510. The output of the multiplexor 516 is connected to the input of a tri-state buffer 518, which drives processor address bit PA[3] and the invalidation request input INV to a Pentium processor. This dual connection to PA[3] and INV can be done as PA[3] is ignored during snoop cycles by both Pentium and 486 processors, INV is ignored by the Pentium on other than snoop cycles and the described logic properly provides the PA[3] bit on non-snoop cycles. The tristate buffer 518 is enabled by the signal PAOE_.

Referring back to FIG. 3A, in the transition from state M to state N, the signal LOCWR_NEEDS_LPA is maintained high to keep the address latched in the CMC 210, and the signal D_LOCWR_PAHOLD is maintained high to keep the signal AHOLD asserted. From state N, the state machine LOCWRST transitions back to state A. In this transition, the signals LOCWR_NEEDS_LPA, D_LOCWR_PAHOLD, LOCRW_HOLD_PA_STABLE, and D_LOCWR_SELINV are maintained asserted. In addition, signals D_LOCWR_PEADS, D_LOCWR_PRDY, and D_LOCWR_PBRDY are asserted high in this transition. The signal D_LOCWR_PEADS is provided to one input of a NOR gate 380, whose other inputs receive signals D_L1SNP_PEADS and D_L1C_PEADS, which are asserted high during other L1 cache line invalidation cycles. The output of the NOR gate 380 is connected to the D input of a D flip-flop 378, which is clocked by the signal CLK2. The output of the D flip-flop 378 is connected to the input of a tri-state buffer 374, whose output drives the external address strobe EADS* to indicate to the microprocessor 200 that a valid snoop address has been driven on the processor address bus PA. The tri-state buffer 364 is enabled by the active low signal IOBUFOE_. The signal D_LOCWR_PRDY is provided to the OR gate 410 in FIG. 4 for activating the ready signal RDY*, which is received by either of the 486 or P24 processors as an end-of-cycle acknowledge. Similarly, the signal D_LOCWR_PBRDY activates the signal BRDY* as an end-of-cycle acknowledge to the P54 processor.

Thus, a circuit has been described for responding to a microprocessor-generated write of a write-prootected area of memory by invalidating the cache line corresponding to the write address in the microprocessor's internal cache. This allows write-protected areas of the main memory to be cached in the internal cache of the microprocessor. The circuit monitors the processor bus to determine if the address associated with a write cycle corresponds to the write-protected area of memory. If so, the circuit latches in the write address, gains control of the processor bus by asserting an address hold signal to float the address pins of the microprocessor, and generates a snoop cycle on the processor bus using the address that was just latched. The cache line of the microprocessor's internal cache corresponding to the snoop address is invalidated, thereby preserving coherency of the write-protected data.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A circuit for invalidating an internal cache memory of a microprocessor connected to a bus in a computer system, wherein the microprocessor includes an invalidation pin and a plurality of processor address pins, and wherein the internal cache memory has a plurality of portions and is coupled to the invalidation pin and the plurality of processor address pins but uses a first number of the plurality of processor address pins during a snoop cycle, the first number being less than the full number in the plurality of processor address pins, the circuit comprising:

a plurality of circuit address pins each coupled to one of the processor address pins;

a snoop cycle generator coupled to the bus for generating a snoop cycle on the bus;

an address signal provider coupled to said snoop cycle generator and said plurality of circuit address pins for providing a plurality of address signals to said plurality of circuit address pins, wherein said address signal provider provides a snoop address on said plurality of address signals to a first number of said plurality of circuit address pins corresponding to the first number of the plurality of processor address pins if a snoop cycle is generated on the bus; and an invalidation signal provider coupled to said snoop cycle generator, said address signal provider, and one of said plurality of circuit address pins for providing an invalidation signal to said one of said circuit address pins, wherein said one of said circuit address pins is other than one of said first number of said circuit address pins, and wherein said one of said circuit address pins is further coupled to said invalidation pin in addition to being coupled to a corresponding one of the processor address pins.

2. The circuit of claim 1, wherein the internal cache memory portions have a first width, and wherein a second number of said plurality of processor address pins are used to access one of the plurality of portions of the internal cache memory, said second number being determined from said first width.

3. The circuit of claim 2, wherein the bus includes a data portion having a second width, said first width being greater than said second width.

4. The circuit of claim 3, wherein said first width is 32 bytes, and wherein said second width is 8 bytes.

5. The circuit of claim 4, wherein the microprocessor is a Pentium processor.

6. The circuit of claim 1, wherein said snoop cycle generating means asserts a snoop signal to indicate a snoop cycle, and wherein said invalidation signal providing means includes a multiplexor receiving one of said plurality of address signals, said invalidation signal, and said snoop signal, said multiplexor providing an output signal to said one of said circuit address pins, wherein said snoop signal selects either said invalidation signal or said one of said circuit address signals to be provided to said output signal.

7. The circuit of claim 6, wherein said plurality of address signals includes a least significant bit, said one of said plurality of address signals received by said multiplexor being said least significant bit.

\* \* \* \* \*